Sept. 14, 1965 K. E. KRYLOW ETAL 3,206,736

SELF-RESETTING MAGNETIC MEMORIES

Filed March 12, 1964

INVENTORS
Konstanty E. Krylow
James T. Perry
BY C. R. Gulbrandsen
ATTY.

3,206,736

SELF-RESETTING MAGNETIC MEMORIES

Konstanty E. Krylow, Chicago, and James T. Perry, Glen Ellyn, Ill., assignors to Automatic Electric Laboratories, Inc., Northlake, Ill., a corporation of Delaware Filed Mar. 12, 1964, Ser. No. 351,498
2 Claims. (Cl. 340—174)

This invention relates to magnetic memory systems and in particular to mechanically alterable semipermanent magnetic memories.

There have been several types of semipermanent information storage in the area of mechanically alterable magnetic memories. One of these employs permanent magnets in or on a code card to inhibit magnetic remanent state reversals in associated bit locations of a magnetic wire memory. Another of these memories employs a conductive sheet with holes therein as a code card. This latter type of memory employs the presence of conductive material at bit locations and the eddy currents induced therein to magnetically aid in magnetic state reversals. Bit locations having one of the holes associated therewith will not experience such aiding eddy currents, and therefore, will not experience magnetic state reversals. Our U.S. patent application entitled, "Magnetic Memory System," Serial No. 132,079 filed August 17, 1961, and assigned to the same assignee as the first invention, describes a magnetic memory system of the eddy current type. In that system word solenoids are driven with a read current pulse to extract information from the memory. The read pulse is followed by a write pulse of opposite polarity to restore the extracted information. The changeable code card is a copper sheet with holes therein at bit locations which are to store a ZERO. Bit locations of a magnetic wire storage device which are associated with the presence of copper experience magnetic state reversals when its word solenoid is energized. Bit locations associated with the hole in the copper sheet remain in the same magnetic state at all times.

Even though magnetic wire memories have a relatively high bit density, there is a need to further compact such memories with the ever-increasing requirements for larger capacity. These memories are usually packaged in a folded plane or layer manner employing wrap-around solenoids and encapsulated magnetic storage devices as shown in the aforementioned application, Serial No. 132,079. Therefore, considerable spacing problem exists since space has been required between the individual layers to prevent magnetic interaction of the components.

Another problem associated with magnetic memories is the complexity of electronic equipment required to address or drive the word solenoids. In the memory described in our abovementioned patent application Serial No. 132.079, a read pulse must be followed by a write pulse to restore a ONE even though the code card indicates a ONE should be stored in a particular location since a readout ONE location essentially stores a ZERO unless a ONE is rewritten. The code card prevents a ONE in a ZERO coded location; rewriting prevents a ZERO in a ONE coded location.

The present invention overcomes the above problems in the eddy current type memories by employing high permeability magnetic plates to aid the word solenoids and the code cards in switching the remanent state of bit locations. These high permeability plates, in one embodiment, give more control of the information storage to the coded sheets and allow more simplicity in the design of solenoid driving apparatus by eliminating the need for the write pulse.

As will be seen from the discussion below, by practicing this invention, lower drive currents may be used in memories employing the permanent magnet inhibiting technique and still retain control of the information stored by the permanent magnet code card.

The various embodiments of the invention will show that the placement of the high permeability magnetic plates provides certain advantages to one embodiment and not to another. In practice therefore, the disposition of the magnetic plates may differ from one memory to the next according to the particular requirements of the system in which it is used.

It is an object of the invention to provide improved magnetic memory systems.

Another object of the invention is to provide improved magnetic wire memories of greater information storage density.

Another object of the invention is to provide an improved magnetic memory system which is self-resetting in that a single current pulse is employed for both reading and writing.

These and other objects and features of the invention will become apparent and the invention will best be understood from the following description and the accompanying drawings.

Figures 1, 2, 3, 4:
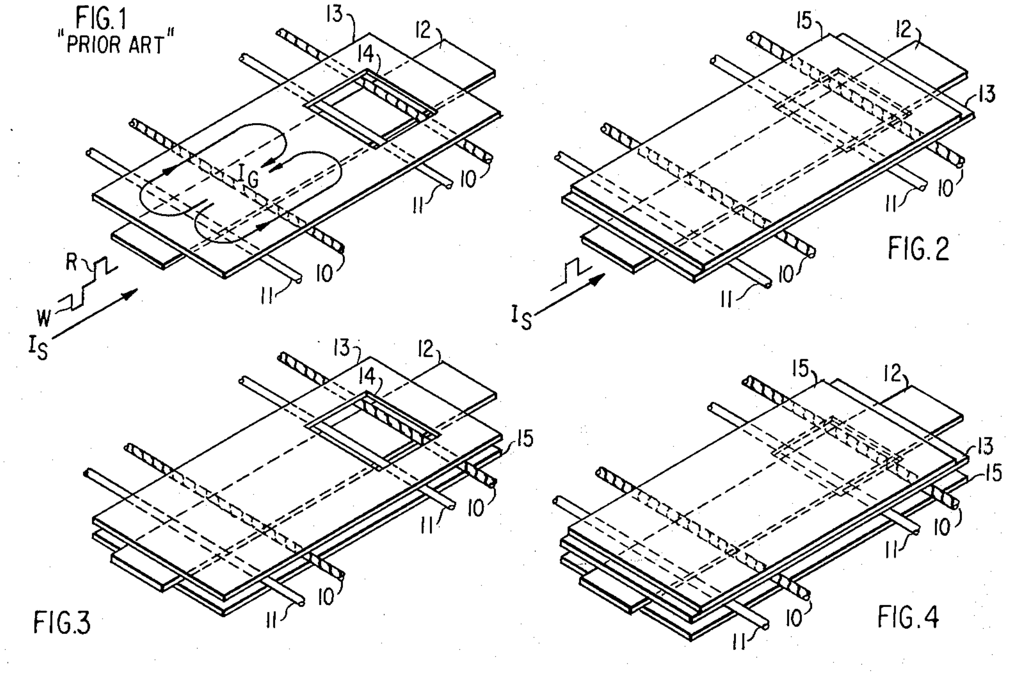
FIG. 1 is a schematic representation of a prior art eddy current type memory.
FIG. 2 is a schematic representation of an embodiment of the invention employing high permeability material on the code card side of a memory plane.
FIG. 3 is a schematic representation of another embodiment of the invention employing high permeability material on the solenoid side of a memory plane.
FIG. 4 is a schematic representation of another embodiment of the invention employing high permeability material on both the code card side and on the solenoid side of a memory plane.

FIG. 1 describes an eddy current type memory substantially as described in our above-mentioned patent application Serial No. 132,079. Included in that memory in the layer fashion are a solenoid 12, magnetic storage devices 10 and return conductors 11, and a conductive sheet 13 having an aperture 14 therein. Hereinafter, an aperture will be designated as coding a ZERO. The magnetic storage device 10 is a variation of the devices described by A. H. Bobeck in his article "A New Storage Element Suitable for Large-Sized Memory Arrays—The Twistor," published in the November 1957 edition of the Bell System Technical Journal, vol. XXXVI, pp. 1319–1340. Reference may be had to that article for the particular details of magnetic remanent state switching in magnetic wire devices. Reference may be taken to "Principles of Electric and Magnetic Circuits," Boast, Harper Bros., 1950, and to our above-mentioned patent application Serial No. 132,079 for an understanding of the generation of eddy currents and the virtual solenoid action of the conductive sheet 13. As previously stated, it is necessary to drive the solenoid 12 with a current $I_s$ containing a read pulse referenced R to extract information followed by a write pulse referenced W to restore information.

Figure 7:
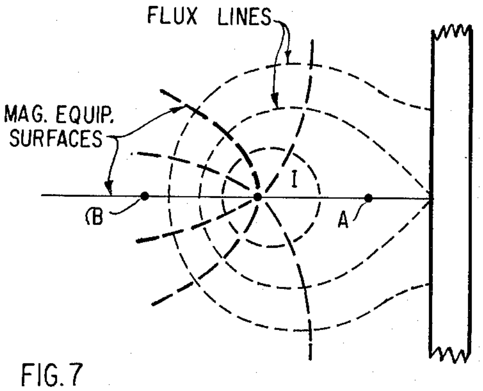
FIG. 7 is a diagram of magnetic field modification according to the underlying principles of the invention and is offered as an aid to understanding the invention.

A clear picture of the invention may be had by first referring to FIG. 7. FIG. 7 describes how the magnetic equipotential surfaces are bent away from a magnetic plane 15 when the plane, parallel to a filamentary current I, is moved from infinity toward the current. The equipotential surfaces become spread apart on the side of the current facing the plane and squeeze together on the side of the current away from the plane. Accordingly, the magnetizing force at point A is decreased and the magnetizing force at point B is increased. The extent to which the original magnetic field is modified by the magnetic plane is dependent on the permeability of the plane and its distance from the source of magneto-motive force. The magnitude of the change is increased by either increasing the permeability of the material or decreasing the distance of the plane from the source. Excluding the instance where the filamentary current I lies within the magnetic plane, the maximum change that can occur in the magnetizing force at points A and B is that which reduces the force at A to ZERO and doubles the force at B. This maximum occurs when the filamentary current I is coincident with the surface of a plane having infinite permeability. The various advantages of the following embodiments of the invention may be realized by drawing parallels between the structure of the embodiments and the illustration in FIG. 7.

Referring to FIG. 2, a magnetic memory arrangement is shown that is similar to that of FIG. 1. A plate 15 of high permeability material has been placed over the coded conductive sheet 13 which is preferred if the code card is to receive a high degree of control over information storage. It is well known, as previously stated, that the introduction of magnetic materials into a magnetic field may alter the shape of the field or its magnetic intensity or both. Again, the extent to which a magnetic field is modified by the introduction of magnetic material is dependent on the permeability of the material and its distance from the source of the magnetic field. The magnitude of the change in magnetizing force is increased by either increasing the permeability of the magnetic plane or by decreasing its distance from the source of the field. In other words high permeability material may be employed to focus or concentrate the magnetic intensity of a magnetic field in a predetermined area. In FIG. 2 therefore, and in the following embodiments, the high permeability material 15 is employed to extend control over the information stored to either the coding sheet 15 or the solenoid 12. This can be understood by relating FIG. 2 to FIG. 7. In relating these two representations it should be remembered that decreasing the distance between the source of the magnetic field and the high permeability material increases the degree of magnetic field modification. Therefore, the source of magnetic field (current I) in FIG. 7 can be thought of as the eddy currents in the conductive sheet 13, the coding sheet being much closer to the plate 15. Thus, the magnetic concentration at point B of FIG. 7 is related to the area in which the magnetic storage devices 10 are positioned in FIG. 2. It is easily seen that the embodiment of the invention described by FIG. 2 gives a high degree of information storage control to the coding sheet 13.

Referring to FIG. 3, a magnetic memory plane is shown that is similar to FIGS. 1 and 2 but has the high permeability plate 15 located below the solenoid 12. In relating FIG. 3 to FIG. 7 the source of magnetomotive force that is nearest the magnetic plate 15 in this instance is the solenoid 12 with its energizing current. Solenoid 12 can therefore be thought of as the source of magnetomotive force I in FIG. 7. Again, the magnetic concentration at Point B is shown to be in an area relating to the position of the magnetic storage devices 10 in FIG. 3; however, in the embodiment of the invention described in FIG. 3 there is more concentration of a magentic field in this area than in the embodiment of FIG. 2. This is primarily due to the relative amounts of magnetomotive force normally supplied by the solenoid and by the virtual solenoid, and by their relative distances to the sheet 15. Also, in FIG. 3 it can be understood that the coding sheet now has less control over the information stored and the solenoid 12 has more control.

Referring to FIG. 4, a memory arrangement can be seen that is very similar to both FIGS. 2 and 3 in that a high permeability plate 15 is employed on the coding sheet side of the plane and on the solenoid side of the plane. Since both FIGS. 2 and 3 have been related to FIG. 7, it is not necessary to relate FIG. 4 to FIG. 7. It should be noted that in a particular memory employing the embodiment of FIG. 4 the same ONE to ZERO ratio was obtained as that found for the prior art arrangement of FIG. 1; however, the output signals were of greater magnitude.

Figure 5:
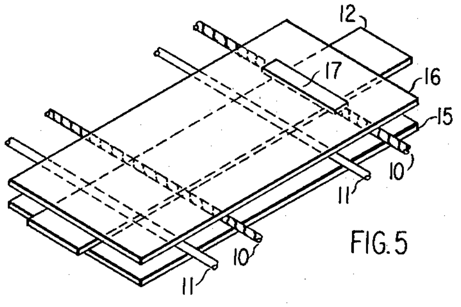
FIG. 5 is a schematic representation of a permanent magnet inhibiting code card type memory plane employing high permeability material on the solenoid side of the memory plane.

Referring to FIG. 5, a magnetic memory arrangement is described which is similar to the other embodiments shown herein, in particular FIG. 3, but has one major distinction. In FIG. 5 the high permeability material is placed below the solenoid 12 as it was in FIG. 3. Instead of the conductive coding sheet 13, FIG. 5 employs a coding sheet 16 of nonconductive material having embedded therein or fixed thereto permanent magnets 17 (only one shown) at bit locations where its is desired to code a ZERO. Basically, a memory of the permanent magnet type is described by D. G. Clemons in his U.S. Patent 3,084,336. The just-mentioned reference however does not employ high permeability plates to aid in switching bit locations not associated with a permanent magnet. The present invention allows lower solenoid drive currents to be used in permanent magnet type memories while still retaining a high degree of information storage control with the changeable coded cards. FIG. 5 relates to FIG. 7 in a manner that is similar to FIG. 3. The difference between the two embodiments is the choice of coding means. The embodiment shown in FIG. 5 provides permanent magnets at bit locations where a ZERO is to be stored to place those locations in a remanent state indicative of a ZERO. The permanent magnets hold the associated bit location in a remanent state indicative of a ZERO at all times. The solenoid alone can be used to address the memory.

The foregoing has dealt with improvements relating to the magnetic field intensity in an area which includes the magnetic storage devices. The high permeability plates further provide isolation of memory planes when such planes are placed in a memory stack. In the case of the eddy current type memory employing the structure of the embodiment shown in FIG. 4, the shielding effect offered by the high permeability plates may be realized with less than two plates per plane. For example, a memory stack of three planes will employ only four magnetic plates instead of eight by having one magnetic plate serve a memory plane on either of its sides.

Figure 6:
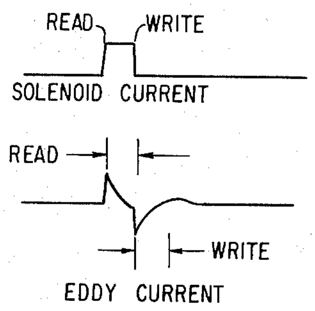
FIG. 6 is a graphical representation of solenoid current and eddy current as they pertain to self-resetting eddy current type memories.

Referring to FIGS. 1, 2 and 6, it was noted in FIG. 1 that a write pulse was required following a read pulse to restore information in an interrogated bit location. Remembering back, the virtual solenoid effect of conductive coding card 13 is much more pronounced in the embodiment shown in FIG. 2. Thus, it should be realized that the eddy currents induced have a much greater effect on the information stored. The solenoid energizing current $I_s$ has accordingly been shown as a single pulse in FIG. 2. Referring to FIG. 6, this single pulse solenoid current is shown along with the resulting eddy currents which are generated in the conductive sheet 13. FIG. 2 is therefore also preferred for the self-resetting feature. Self-resetting may be obtained by other embodiments at the cost of impractical drive circuits and circuits.

The leading edge of the pulse is referenced READ and the trailing edge is referenced WRITE. The leading edge of the solenoid pulse causes an eddy current to be generated in the virtual solenoid which exhibits an exponential decay toward zero. The trailing edge of the solenoid current causes an eddy current of the opposite direction to be generated which is also characterized by an exponential decay toward zero. In order to minimize the magnitude of solenoid current it is advantageous to employ a pulse which has a time width that is substantially equal to the decay time of the reading eddy current so that generation of the writing eddy current is not hindered by somewhat of a residual magnetic field due to the read eddy current not being sufficiently decayed. In a particular memory tested it was found that this self-resetting feature can be employed in a memory, such as that shown in FIG. 2, by using approximately the same cycle time and same current magnitude as was previously employed in the eddy current type memory, such as shown in FIG. 1. An advantage of the self-resetting magnetic memory is that it is no longer necessary to generate opposite polarity pulses in sequence for reading and then rewriting information.

While we have described our invention in various embodiments and by specific illustrations, many changes and modifications may be made by one skilled in the art without departing from the spirit and scope of the invention and should be included in the appended claims.

What is claimed is:

1. A self-resetting magnetic memory in combination comprising:

(a) a source of pulses having a leading edge and a trailing edge;

(b) conductor means connected to said pulse source producing a time changing magnetic field in a first direction in response to said leading edge and in a second direction in response to said trailing edge;

(c) electrical conductive means inductively coupled to said conductor means producing first and second aiding magnetic fields, respectively, in response to said time varying fields;

(d) means positioned in close proximity to said conductive means concentrating the magnetic intensity of said magnetic fields in a predetermined area; and (e) magnetic storage means positioned in said predetermined area having two magnetic remanent states, and switched by the combined magnetic intensities of said first two fields from one remanent state to the other remanent state, and switched by the combined magnetic intensities of said second two fields from said other remanent state to said one remanent state.

2. The memory according to claim 1, wherein said electrical conductive means includes a conductive sheet having eddy currents of opposite direction induced therein corresponding to said leading and trailing edges of each said pulse, said eddy currents being characterized by an exponential decay, and wherein the time width of each said pulse is of sufficient duration that the eddy currents corresponding to said leading edge decay substantially to zero before the end of each said pulse.

References Cited by the Examiner

UNITED STATES PATENTS

| | | | |
|---|---|---|---|
| 3,084,336 | 4/63 | Clemons | 340—174 |
| 3,102,999 | 9/63 | Bernemyr | 340—174 |
| 3,163,855 | 12/64 | Bobeck | 340—174 |

IRVING L. SRAGOW, *Primary Examiner.*